United States Patent

Sato

(10) Patent No.: US 8,855,365 B2
(45) Date of Patent: Oct. 7, 2014

(54) IMAGE PROCESSING DETERMINING APPARATUS

(75) Inventor: Masayuki Sato, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 328 days.

(21) Appl. No.: 13/433,532

(22) Filed: Mar. 29, 2012

(65) Prior Publication Data

US 2012/0249399 A1 Oct. 4, 2012

(30) Foreign Application Priority Data

Mar. 31, 2011 (JP) ................. 2011-077966

(51) Int. Cl.
*G06K 9/00* (2006.01)
*G06T 7/00* (2006.01)

(52) U.S. Cl.
CPC ..... *G06T 7/0085* (2013.01); *G06T 2207/30252* (2013.01); *G06T 2207/20192* (2013.01)
USPC ........................................................ 382/103

(58) Field of Classification Search
USPC ........................................................ 382/103
See application file for complete search history.

(56) References Cited

U.S. PATENT DOCUMENTS

| | | | |
|---|---|---|---|
| 6,819,779 B1 * | 11/2004 | Nichani ................. | 382/104 |
| 2001/0040505 A1 * | 11/2001 | Ishida et al. ........... | 340/435 |
| 2004/0057600 A1 * | 3/2004 | Niwa ..................... | 382/103 |
| 2007/0192020 A1 * | 8/2007 | Brulle-Drews et al. .... | 701/200 |
| 2008/0204577 A1 * | 8/2008 | Tsuruoka ................ | 348/241 |
| 2009/0228204 A1 * | 9/2009 | Zavoli et al. ........... | 701/208 |
| 2009/0262192 A1 * | 10/2009 | Schofield et al. ......... | 348/148 |

FOREIGN PATENT DOCUMENTS

| | | | | |
|---|---|---|---|---|
| JP | 2001-359088 A | 12/2001 | | |
| JP | 2005-75190 A | 3/2005 | | |
| JP | 2005075190 A | * 3/2005 | ............ | B60K 35/00 |
| JP | 2008-46761 A | 2/2008 | | |
| JP | 2008046761 A | * 2/2008 | | |

OTHER PUBLICATIONS

Japanese Office Action dated Apr. 23, 2013, issued in corresponding Japanese Patent Application No. 2011-077966.

* cited by examiner

*Primary Examiner* — Stephen R Koziol
*Assistant Examiner* — Delomia Gilliard
(74) *Attorney, Agent, or Firm* — Westerman, Hattori, Daniels & Adrian, LLP

(57) ABSTRACT

An edge image generator in an image processing determining apparatus extracts multiple edges from an image included in display data output from an external device, such as a terminal unit, a navigation unit, or an imaging unit. Then, the edge image generator selects certain edges from the extracted multiple edges by a certain selection method matched with characteristics of the external device to generate an edge image.

12 Claims, 5 Drawing Sheets

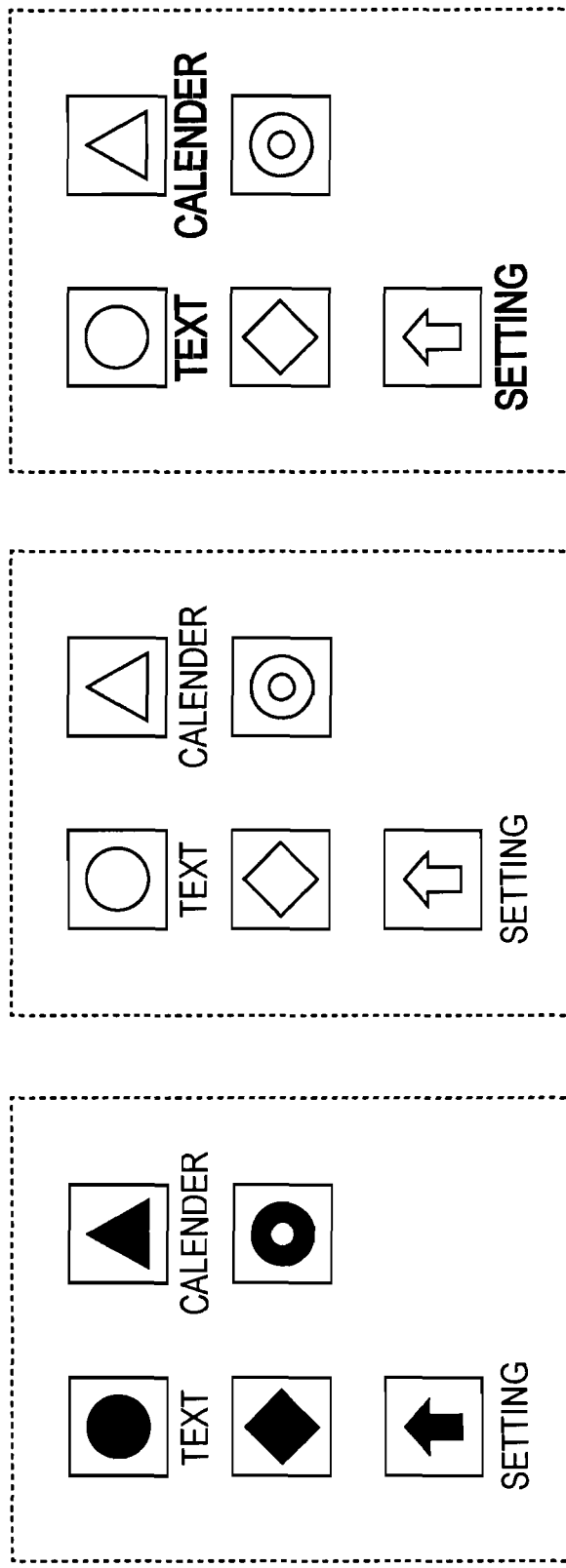

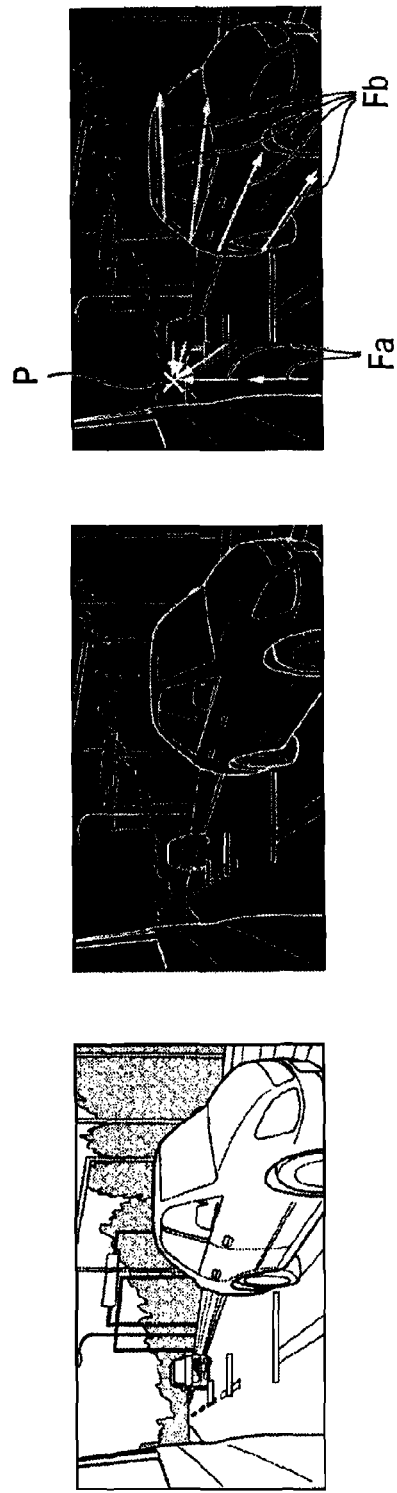

IMAGE PROCESSING DETERMINING APPARATUS

CROSS REFERENCES TO RELATED APPLICATIONS

The present application claims priority under 35 U.S.C. §119 to Japanese Patent Application No. 2011-077966, filed Mar. 31, 2011, entitled "Image processing determining apparatus." The contents of this application are incorporated herein by reference in their entirety.

FIELD OF THE INVENTION

The present embodiment relates to an image processing determining apparatus.

BACKGROUND OF THE INVENTION

Hitherto, processing systems are known which perform preprocessing for extracting moving bodies to image data output from, for example, cameras that capture images of roads to transmit the image data subjected to the preprocessing to vehicles (for example, refer to Japanese Unexamined Patent Application Publication No. 2008-46761).

In the processing systems, the vehicles that have received the image data subjected to the preprocessing, for example, display the image data (background difference images, time difference images, or edge images) superimposed on original images.

Although only the display to cause drivers to recognize the moving bodies in dead angles from the vehicles is performed on the basis of the image data output from the cameras that capture images indicating the traffic situations of the roads in the processing systems in related art, the display is not limited to the above one. It is desired to perform display to cause the drivers to accurately recognize a variety of information on the basis of image data output from various external devices.

SUMMARY OF THE INVENTION

The present embodiment provides an image processing determining apparatus capable of causing a driver to accurately recognize a variety of information on the basis of image data output from various external devices.

According to an embodiment of the present disclosure, an image processing determining apparatus includes an external device (for example, a terminal unit 14, a navigation unit 15, or an imaging unit 16) outputting display data including an image; an edge extracting unit (for example, an edge image generator 21) configured to extract a plurality of edges indicating the outline of at least one object in the image included in the display data output from the external device with lines; an edge selecting unit (for example, the edge image generator 21) configured to select certain edges from the plurality of edges extracted by the edge extracting unit by a certain selection method; an edge image generating unit (for example, the edge image generator 21) configured to generate an edge image composed of the certain edges selected by the edge selecting unit; and a display unit (for example, a first display device 12 or a second display device 13) displaying the edge image generated by the edge image generating unit. The edge selecting unit selects the certain edges by the selection method matched with characteristics of the external device.

In the image processing determining apparatus, the external device may be an imaging unit (for example, the imaging unit 16) that captures the image. The edges of a moving body having an amount of movement higher than or equal to a predetermined value, among the objects in the image included in the display data, may be selected by the selection method performed by the edge selecting unit.

The image processing determining apparatus may further include a character determining unit (for example, the edge image generator 21) configured to recognize a character. The external device may be a terminal unit (for example, the terminal unit 14) that outputs the display data including an icon and a character in the image. The edges of the icon and the character in the image included in the display data may be selected by the selection method performed by the edge selecting unit. The display unit may enlarge an area recognized as including the character by the character determining unit, compared with the other areas.

In the image processing determining apparatus, the external device may be a navigation unit (for example, the navigation unit 15) that outputs the display data that includes road information and that includes map data as the image. The edges including the road information in the image included in the display data may be selected or thick-line edges having a predetermined thickness or more may be selected from the edges by the selection method performed by the edge selecting unit.

In the image processing determining apparatus, the display unit may include a heads-up display (for example, the first display device 12) that performs display at least on a front window of a vehicle and another display device (for example, the second display device 13). The edge selecting unit may set an amount of the certain edges selected for display in the heads-up display so as to be smaller than an amount of the certain edges selected for display in the other display device.

With the image processing determining apparatus according to the embodiment of the present disclosure, the display of different edge images in accordance with the characteristics of the various external devices in the display unit allows the information having the accurate content to be displayed with an appropriate amount of information.

In addition, since the amount of data of the edge image is smaller than that of the image included in the display data, it is possible to reduce the load of processing (for example, display in the display unit) of the edge image.

Furthermore, with the image processing determining apparatus, the display of the edge image composed of the edges of the moving body having the amount of movement higher than or equal to the predetermined value in the display unit allows an appropriate attention to be drawn to the moving body.

Furthermore, with the image processing determining apparatus, the display of the edge image resulting from a reduction of excess information from the image of icons and characters in the display unit prevents the view of a viewer from being blocked to display the information having the accurate content with an appropriate amount of information.

The enlargement of the area recognized as including the characters, compared with the other areas, allows the visibility of the characters to be improved.

Furthermore, with the image processing determining apparatus, the display of the edge image resulting from a reduction of excess information from the image of map data in the display unit allows the information having the accurate content to be displayed with an appropriate amount of information.

Furthermore, with the image processing determining apparatus, it is possible to display the information having the accurate content with an appropriate amount of information while suppressing the view of the viewer on the front window of the vehicle or over the front window thereof from being blocked.

BRIEF DESCRIPTION OF THE DRAWINGS

The advantages of the invention will become apparent in the following description taken in conjunction with the drawings, wherein:

FIGS. 2A to 2C show examples of edge images generated by the image processing determining apparatus according to the embodiment;

FIGS. 3A to 3E show examples of edge images acquired from an image captured by an imaging unit in the image processing determining apparatus according to the embodiment;

DESCRIPTION OF THE PREFERRED EMBODIMENTS

An image processing determining apparatus according to an embodiment of the present disclosure will herein be described with reference to the attached drawings.

Figure 1:
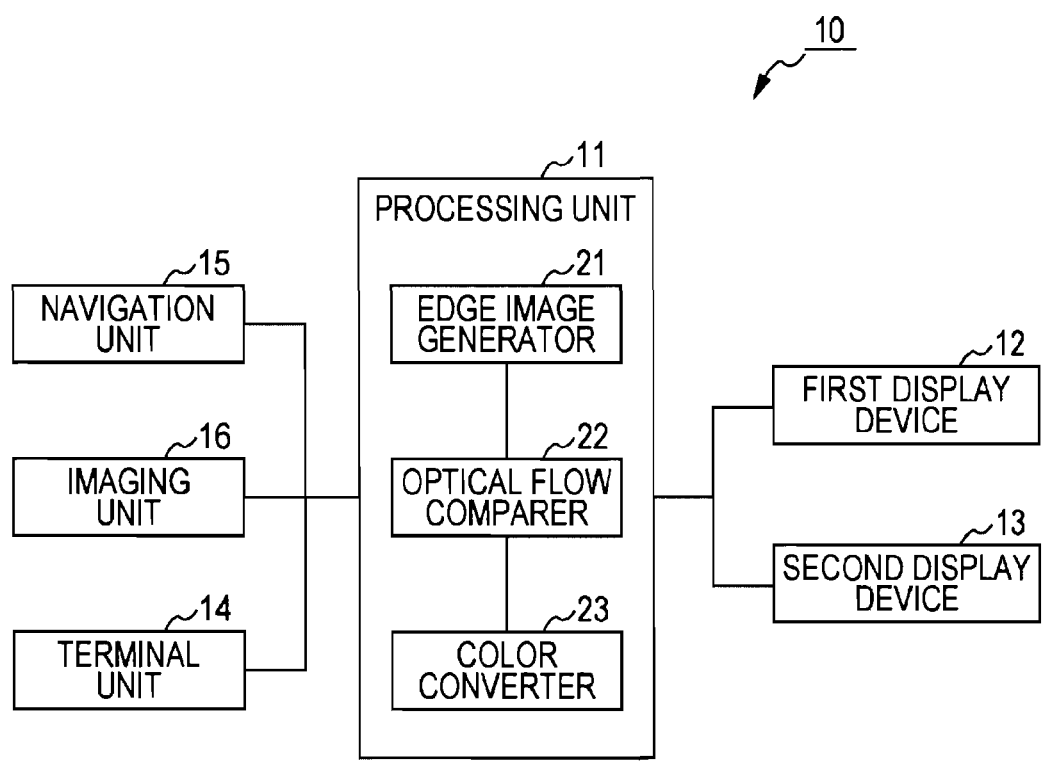
FIG. 1 is a diagram showing an example of the configuration of an image processing determining apparatus according to an embodiment of the present disclosure.

FIG. 1 is a diagram showing an example of the configuration of an image processing determining apparatus 10 according to the present embodiment. Referring to FIG. 1, the image processing determining apparatus 10 includes a processing unit 11, a first display device 12, a second display device 13, a terminal unit 14, a navigation unit 15, and an imaging unit 16.

The processing unit 11 includes an edge image generator 21, an optical flow comparer 22, and a color converter 23.

The edge image generator 21 extracts multiple edges from an image included in display data output from an external device (for example, the terminal unit 14, the navigation unit 15, or the imaging unit 16) connected to the processing unit 11. The multiple edges indicate the outlines of objects in the image with lines. The edge image generator 21 selects certain edges from the extracted multiple edges by a certain selection method matched with characteristics of the external device to generate an edge image composed of the selected certain edges.

When the external device is the terminal unit 14 that outputs the display data including icons and characters as images, the edge image generator 21 selects the edges of the icons and the characters from the image included in the display data from which the icons and characters in the image can be recognized and which is output from the terminal unit 14.

For example, when the display data including character information, icons, and graphics as images is output in accordance with various functions of the terminal unit 14, the edge image generator 21 selects certain edges corresponding to the various functions of the terminal unit 14.

For example, in the case of a message display function to display a message in response to selection of a certain icon by an operator, the edge image generator 21 extracts only the character information from the display data to select the edges having the amount of information (for example, only the titles of electronic mails or the character information having a predetermined number of characters) which does not interfere with the driving.

For example, in the case of an operational function to perform various operations, such as a music operating function that operates output of music, the edge image generator 21 selects only the edges of operation icons from the display data including various operation screens, the operation icons, etc. as images.

For example, in the case of an image display function to select an appropriate image from multiple images to display the selected image of, for example, a photo album or a photo frame, the edge image generator 21 does not select the edges of the character information, the operation icons, etc. but selects only the edges of the image to be displayed from the display data.

For example, in the case of a menu display function to display various operation menus shown in FIG. 2A, the edge image generator 21 selects the edges of the character information indicating the content of menu items and the icons for the menu items from the display data, as shown in FIG. 2B.

Then, as shown in FIG. 2C, the edge image generator 21 sets the edges in areas recognized as including the character information, among the selected edges, so as to be enlarged, compared with those in the other areas.

In addition, when the external device is the navigation unit 15, the edge image generator 21 selects the edges including road information from the image included in the display data output from the navigation unit 15 or selects thick-line edges having a predetermined thickness or more from the edges.

For example, when map information is included in the display data, the edge image generator 21 extracts only the lines of major roads and/or the edges of characters in an area near the own vehicle in the map and sets the extracted edges so as to be enlarged with thick lines or large characters.

For example, when graphic images resulting from three-dimensional display of intersections, buildings, etc. are included in the display data, the edge image generator 21 extracts the edges of the graphic image.

For example, when an image of a still picture, etc. of a real landscape is included in the display data, the edge image generator 21 extracts certain edges from many edges extracted for various objects, etc. in the image with fine edges excluded on the basis of the intensity, the thickness, the continuity, or the like of the edges.

For example, when an image including characters on, for example, road signs or signboards is included in the display data, the edge image generator 21 sets the edges of the characters extracted on the basis of character recognition processing so as to be enlarged with large characters, compared with the actual characters.

Furthermore, when the external device is the imaging unit 16 that outputs the display data including an image outside the vehicle, the edge image generator 21 selects the edges of moving bodies having a predetermined amount of movement or more from the objects in the image included in the display data output from the imaging unit 16.

For example, when the imaging unit 16 captures images on a left side outside and behind the vehicle, the edge image generator 21 extracts the edges enhancing the outlines of a road, other vehicles, pedestrians, etc. shown in FIG. 3B from an image shown in FIG. 3A. Here, the edge image generator 21 extracts certain edges from many edges extracted for various objects, etc. in the image with fine edges excluded on the basis of the intensity, the thickness, the continuity, or the like of the edges.

The optical flow comparer 22 calculates a vanishing point P in the image, an optical flow Fa (the flow of the image) estimated for each still object in the image, and an optical flow Fb of each moving body in the image on the basis of detection results of a vehicle speed and a yaw rate output from various sensors (not shown) and information about the direction in which the imaging unit 16 captures the image, the angle at which the imaging unit 16 captures the image, etc., as shown in FIG. 3C.

Then, for example, as shown in FIG. 3D, the optical flow comparer 22 extracts only the edges in an area in which the difference between the optical flow Fa estimated for the still object and the optical flow Fb of the moving body is large.

For example, when the display of the edges of information (for example, traffic lanes) on a road surface, which is a still object, is instructed in accordance with a request from the operator or the like, the optical flow comparer 22 may set the edges of the information (for example, the traffic lanes) on the road surface, which is a still object, so as to be displayed, in addition to the edges of the moving body, below the horizontal line and may set the edges in an area in which the difference between the optical flow Fa estimated for the still object and the optical flow Fb of the moving body is large so as to be displayed above the horizontal line, as shown in FIG. 3E.

The color converter 23 converts the display color of the edges extracted by the edge image generator 21 or the optical flow comparer 22 into, for example, a color having a higher color intensity.

The first display device 12 is a heads-up display that performs the display by using a portion on a front window of the vehicle as the display screen.

The second display device 13 is another display device different from the first display device 12. The second display device 13 is, for example, a dash-board display whose display screen is arranged at an upper portion of a dash board of the vehicle, a multi-information display whose display screen is arranged on an instrument panel of the vehicle, or a display whose display screen is arranged near a variety of measuring instrument on the instrument panel of the vehicle.

The amount of edges selected by the edge image generator 21 for the display in the first display device 12, which is a heads-up display, is set so as to be smaller than the amount of edges selected by the edge image generator 21 for the display in the second display device 13, which is another display device.

Figure 4A:
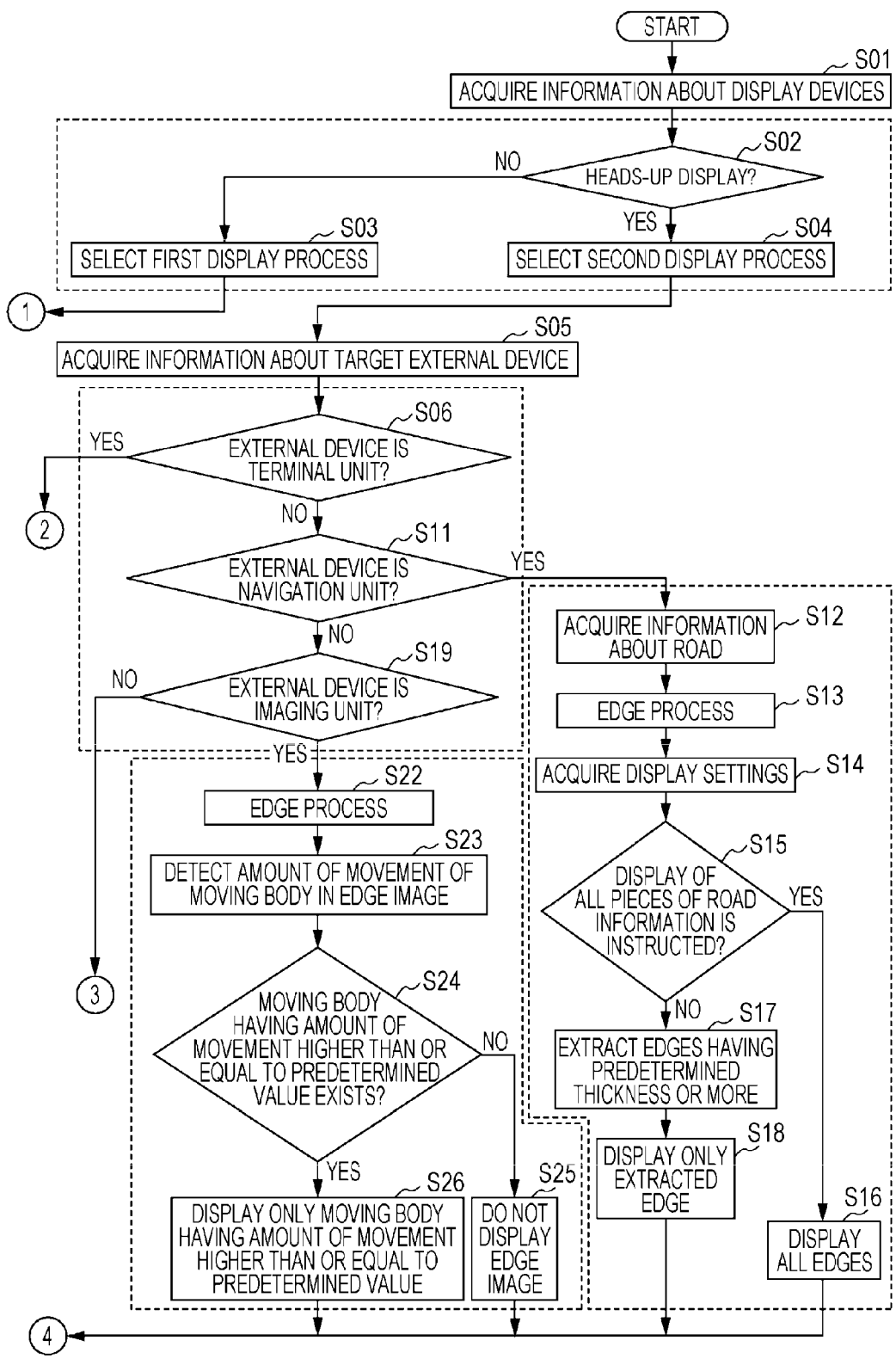
FIGS. 4A and 4B are flow charts showing an operational process of the image processing determining apparatus according to the embodiment.
Figure 4B:
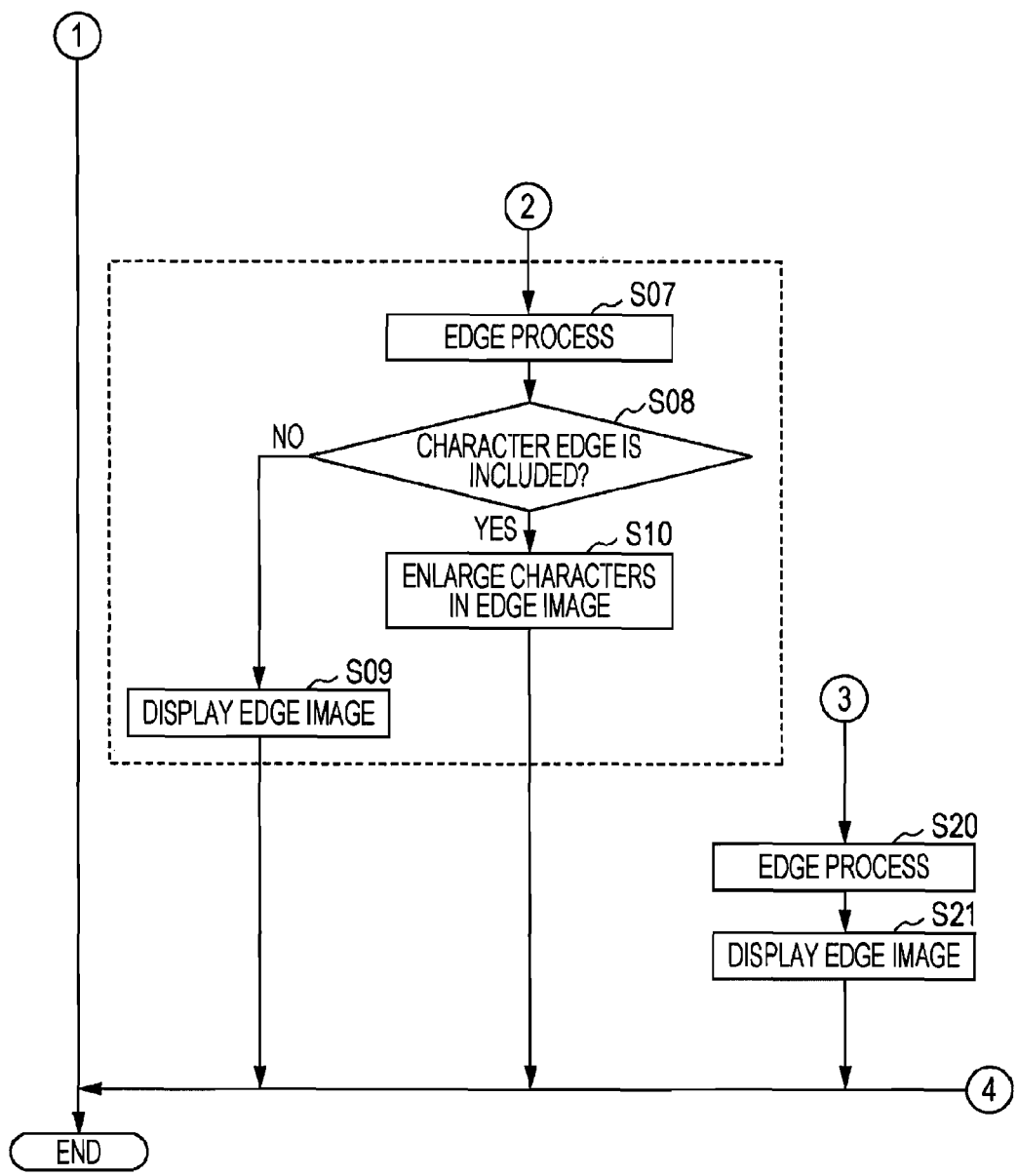

FIGS. 4A and 4B are flow charts showing an operational process of the image processing determining apparatus 10 according to the present embodiment having the above configuration.

Referring to FIGS. 4A and 4B, in Step S01, the image processing determining apparatus 10 acquires information about the first display device 12 and the second display device 13.

In Step S02, the image processing determining apparatus 10 determines whether the processing target is the first display device 12, which is a heads-up display.

If the determination in Step S02 is negative, that is, the processing target is the second display device 13, which is not a heads-up display (NO in Step S02), the process goes to Step S03.

If the determination in Step S02 is affirmative (YES in Step S02), the process goes to Step S04.

In Step S03, the image processing determining apparatus 10 selects a certain first display process. Then, the operational process in FIGS. 4A and 4B is terminated.

The certain first display process may be the same as a certain second display process described below or may be an appropriate process including a certain edge process and a display process of displaying the edge image generated in the edge processing.

In Step S04, the image processing determining apparatus 10 selects the certain second display process.

In Step S05, the image processing determining apparatus 10 acquires information about an external device, which is a display target.

In Step S06, the image processing determining apparatus 10 determines whether the external device is the terminal unit 14.

If the determination in Step S06 is affirmative (YES in Step S06), the operational process goes to Step S07.

If the determination in Step S06 is negative (NO in Step S06), the operational process goes to Step S11.

In Step S07, the image processing determining apparatus 10 performs an edge process of extracting the edges from the image included in the display data output from the terminal unit 14 to generate an edge image.

In Step S08, the image processing determining apparatus 10 determines whether the edges of characters exist in the edge image.

If the determination in Step S08 is negative (NO in Step S08), in Step S09, the image processing determining apparatus 10 displays the generated edge image. Then, the operational process in FIGS. 4A and 4B is terminated.

If the determination in Step S08 is affirmative (YES in Step S08), in Step S10, the image processing determining apparatus 10 enlarges the edges of the characters in the edge image for display. Then, the operational process in FIGS. 4A and 4B is terminated.

In Step S11, the image processing determining apparatus 10 determines whether the external device is the navigation unit 15.

If the determination in Step S11 is affirmative (YES in Step S11), the operational process goes to Step S12.

If the determination in S11 is negative (NO in Step S11), the operational process goes to Step S19.

In Step S12, the image processing determining apparatus 10 acquires an image of road information from the image included in the display data output from the navigation unit 15.

In Step S13, the image processing determining apparatus 10 performs an edge process of extracting the edges from the acquired image of the road information to generate an edge image.

In Step S14, the image processing determining apparatus 10 acquires display settings set by, for example, the operator in advance.

In Step S15, the image processing determining apparatus 10 determines whether the display of all the pieces of the road information in the display data is instructed in the acquired display settings.

If the determination in Step S15 is affirmative (YES in Step S15), in Step S16, the image processing determining apparatus 10 displays the edge image. Then, the operational process in FIGS. 4A and 4B is terminated.

If the determination in Step S15 is negative (NO in Step S15), in Step S17, the image processing determining apparatus 10 extracts only edges having a predetermined thickness or more (for example, the edges of main roads having a predetermined road width or more) from the edge image.

In Step S18, the image processing determining apparatus 10 displays only the extracted edges. Then, the operational process in FIGS. 4A and 4B is terminated.

In Step S19, the image processing determining apparatus 10 determines whether the external device is the imaging unit 16.

If the determination in Step S19 is negative (NO in Step S19), the operational process goes to Step S20.

If the determination in S19 is affirmative (YES in Step S19), the operational process goes to Step S22.

In Step S20, the image processing determining apparatus 10 performs an edge process of extracting the edges from the image included in the display data output from the imaging unit 16 to generate an edge image.

In Step S21, the image processing determining apparatus 10 displays the generated edge image. Then, the operational process in FIGS. 4A and 4B is terminated.

In Step S22, the image processing determining apparatus 10 performs the edge process of extracting the edges from the image included in the display data output from the imaging unit 16 to generate an edge image.

In Step S23, the image processing determining apparatus 10 detects the amount of movement of a moving body in the edge image.

In Step S24, the image processing determining apparatus 10 determines whether any moving body having the amount of movement higher than or equal to a predetermined value exists.

If the determination in Step S24 is negative (NO in Step S24), in Step S25, the image processing determining apparatus 10 displays no edge image. Then, the operational process in FIGS. 4A and 4B is terminated.

If the determination in Step S24 is affirmative (YES in Step S24), in Step S26, the image processing determining apparatus 10 displays only the moving body having the amount of movement higher than or equal to the predetermined value in the edge image. Then, the operational process in FIGS. 4A and 4B is terminated.

As described above, with the image processing determining apparatus 10 according to the present embodiment, the display of different edge images in accordance with the characteristics of the various external devices allows the information having the accurate content to be displayed with an appropriate amount of information.

In addition, since the amount of data of the edge image is smaller than that of the image included in the display data output from the external device, it is possible to reduce the load of processing (for example, display) of the edge image.

Furthermore, the display of the edge image composed of the edges of the moving body having the amount of movement higher than or equal to the predetermined value allows an appropriate attention to be drawn to the moving body.

The display of the edge image resulting from a reduction of excess information from the image of icons and characters prevents the view of a viewer from being blocked even in a heads-up display to display the information having the accurate content with an appropriate amount of information.

The enlargement of the areas recognized as including characters, compared with the other areas, allows the visibility of the characters to be improved.

The display of the edge image resulting from a reduction of excess information from the image of map data allows the information having the accurate content to be displayed with an appropriate amount of information.

In the first display device 12, which is a heads-up display, it is possible to display the information having the accurate content with an appropriate amount of information while suppressing the view of the viewer on the front window of the vehicle or over the front window thereof from being blocked.

Since the portions other than the edges in the edge image are displayed, for example, in black in a liquid crystal display or in a transparent color in a heads-up display, the background on the screen, for example, the scene in front of the vehicle is prevented from being blocked.

Since the edge portions are displayed, for example, in white in a liquid crystal display or at a higher luminance in a heads-up display, it is possible for the viewer to easily view the outlines of objects such as other vehicles, pedestrians, and so on.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. An image processing determining apparatus comprising:
    an external device outputting display data including an image;
    an edge extractor configured to extract a plurality of edges indicating the outline of an object in the image included in the display data output from the external device with lines;
    an edge selector, configured to select certain edges from the plurality of edges extracted by the edge extractor, by a certain selection method;
    an edge image generator, configured to generate an edge image composed of the certain edges selected by the edge selector; and
    a display apparatus displaying the edge image generated by the edge image generator,
    wherein the edge selector selects the certain edges by the selection method matched with characteristics of the external device,
    wherein the display apparatus includes a heads-up display that performs displaying on a front window of a vehicle and another display device, and
    wherein the edge selector sets an amount of the certain edges selected for display in the heads-up display so as to be smaller than an amount of the certain edges selected for display in the another display device.

2. The image processing determining apparatus according to claim 1,
    wherein the external device is an imaging device that captures the image, and
    wherein the edges of a moving body having an amount of movement higher than or equal to a predetermined value, among the objects in the image included in the display data, are selected by the selection method performed by the edge selector.

3. The image processing determining apparatus according to claim 1, further comprising:
    a character determiner configured to recognize a character,
    wherein the external device is a terminal device that outputs the display data including an icon and a character in the image,
    wherein the edges of the icon and the character in the image included in the display data are selected by the selection method performed by the edge selector, and
    wherein the display apparatus enlarges an area recognized as including the character by the character determiner, compared with the other areas.

4. The image processing determining apparatus according to claim 1,
wherein the external device is a navigation device that outputs the display data that includes road information and that includes map data as the image, and
wherein the edges, including the road information in the image included in the display data, are selected, or thick-line edges having a predetermined thickness or more are selected from the edges by the selection method performed by the edge selector.

5. An image processing method comprising:
(i) receiving display data including an image from an external device;
(ii) extracting, by using a computer, a plurality of edges indicating the outline of an object in the image included in the display data output from the external device with lines;
(iii) selecting, by using the computer, certain edges from the plurality of edges extracted in the step (ii), by a certain selection method;
(iv) generating, by using the computer, an edge image composed of the certain edges selected in the step (iii); and
(v) displaying, by a display apparatus, the edge image generated in the step (iv),
wherein the step (iii) selects the certain edges by the selection method matched with characteristics of the external device,
wherein the display apparatus includes a heads-up display that performs displaying on a front window of a vehicle and another display device, and
wherein the step (iii) sets an amount of the certain edges selected for display in the heads-up display so as to be smaller than an amount of the certain edges selected for display in the another display device.

6. The image processing method according to claim 5,
wherein the external device is an imaging device that captures the image, and
wherein the edges of a moving body having an amount of movement higher than or equal to a predetermined value, among the objects in the image included in the display data, are selected by the selection method performed by the step (iii).

7. The image processing method according to claim 5, wherein
the external device is a terminal device that outputs the display data including an icon and a character in the image, and
the method further comprises (vi) recognizing a character,
wherein the edges of the icon and the character in the image included in the display data are selected by the selection method performed by the step (iii), and
wherein the step (v) enlarges an area recognized as including the character by the step (vi), compared with the other areas.

8. The image processing method according to claim 5,
wherein the external device is a navigation device that outputs the display data that includes road information and that includes map data as the image, and
wherein the edges, including the road information in the image included in the display data, are selected, or thick-line edges having a predetermined thickness or more are selected from the edges by the selection method performed by the step (iii).

9. A non-transitory computer readable medium storing program instructions thereon, which when executed perform functions comprising:
(i) receiving display data including an image from an external device;
(ii) extracting a plurality of edges indicating the outline of an object in the image included in the display data output from the external device with lines;
(iii) selecting certain edges from the plurality of edges extracted in the step (ii), by a certain selection method;
(iv) generating an edge image composed of the certain edges selected in the step (iii); and
(v) displaying, by a display apparatus, the edge image generated in the step (iv),
wherein the step (iii) selects the certain edges by the selection method matched with characteristics of the external device,
wherein the display apparatus includes a heads-up display that performs displaying on a front window of a vehicle and another display device, and
wherein the step (iii) sets an amount of the certain edges selected for display in the heads-up display so as to be smaller than an amount of the certain edges selected for display in the another display device.

10. The computer readable medium according to claim 9,
wherein the external device is an imaging device that captures the image, and
wherein the edges of a moving body having an amount of movement higher than or equal to a predetermined value, among the objects in the image included in the display data, are selected by the selection method performed by the step (iii).

11. The computer readable medium according to claim 9, wherein
the external device is a terminal device that outputs the display data including an icon and a character in the image, and
the functions further comprise (vi) recognizing a character,
wherein the edges of the icon and the character in the image included in the display data are selected by the selection method performed by the step (iii), and
wherein the step (v) enlarges an area recognized as including the character by the step (vi), compared with the other areas.

12. The computer readable medium according to claim 9,
wherein the external device is a navigation device that outputs the display data that includes road information and that includes map data as the image, and
wherein the edges, including the road information in the image included in the display data, are selected, or thick-line edges having a predetermined thickness or more are selected from the edges by the selection method performed by the step (iii).

* * * * *